US009124510B2

(12) United States Patent
Gunnarsson et al.

(10) Patent No.: US 9,124,510 B2
(45) Date of Patent: *Sep. 1, 2015

(54) CONFIGURING RELAY CELL IDENTITIES IN CELLULAR NETWORKS

(71) Applicant: Telefonaktiebolaget L M Ericsson (publ), Stockholm (SE)

(72) Inventors: Fredrik Gunnarsson, Linkoping (SE); Gunnar Mildh, Sollentuna (SE); Walter Muller, Upplands Vasby (SE); Ingrid Nordstrand, Sundyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,105

(22) Filed: Dec. 3, 2013

(65) Prior Publication Data
US 2014/0192657 A1 Jul. 10, 2014

Related U.S. Application Data

(63) Continuation of application No. 13/010,507, filed on Jan. 20, 2011, now Pat. No. 8,620,302.

(60) Provisional application No. 61/320,416, filed on Apr. 2, 2010.

(51) Int. Cl.
| | | |
|---|---|---|
| *H04W 24/08* | (2009.01) | |
| *H04L 12/26* | (2006.01) | |
| *H04W 8/26* | (2009.01) | |
| *H04B 7/14* | (2006.01) | |
| *H04W 88/04* | (2009.01) | |

(52) U.S. Cl.
CPC ........ *H04L 43/18* (2013.01); *H04B 7/14* (2013.01); *H04W 8/26* (2013.01); *H04W 88/04* (2013.01)

(58) Field of Classification Search
CPC ...... H04W 24/08; H04W 24/00; H04W 24/02
USPC ............ 370/241, 241.1, 315, 338; 455/422.1, 455/423, 435.1, 560
See application file for complete search history.

(56) References Cited

U.S. PATENT DOCUMENTS

| | | | | |
|---|---|---|---|---|
| 8,620,302 | B2 * | 12/2013 | Gunnarsson et al. | 455/423 |
| 2002/0082050 | A1 * | 6/2002 | Mountney et al. | 455/560 |
| 2010/0279601 | A1 * | 11/2010 | Phan et al. | 455/7 |
| 2011/0208842 | A1 * | 8/2011 | Mildh et al. | 709/220 |

FOREIGN PATENT DOCUMENTS

WO 2009077418 A1 6/2009

OTHER PUBLICATIONS

Office Action issued in corresponding Chinese Patent Application No. 201180017968.X on Nov. 3, 2014, 8 pages.

* cited by examiner

*Primary Examiner* — Kashif Siddiqui
*Assistant Examiner* — Farideh Madani
(74) *Attorney, Agent, or Firm* — Rothwell, Figg, Ernst & Manbeck, P.C.

(57) ABSTRACT

The technology in this application identifies a relay cell serviced by a relay radio node in a radio access network (RAN) of a cellular communications system in which there is a radio connection between the relay radio node and a donor radio base station. The donor radio base station is identified by a RAN donor radio base station cell identifier. A RAN relay cell identifier is determined that uniquely identifies the relay cell within the RAN, the RAN relay cell identifier including a relay cell identifier and a donor base station identifier. The RAN relay cell identifier is then provided or used as needed so that the relay radio node can transmit the RAN relay cell identifier to uniquely identify the relay cell to one or more radio terminals in the RAN.

12 Claims, 6 Drawing Sheets

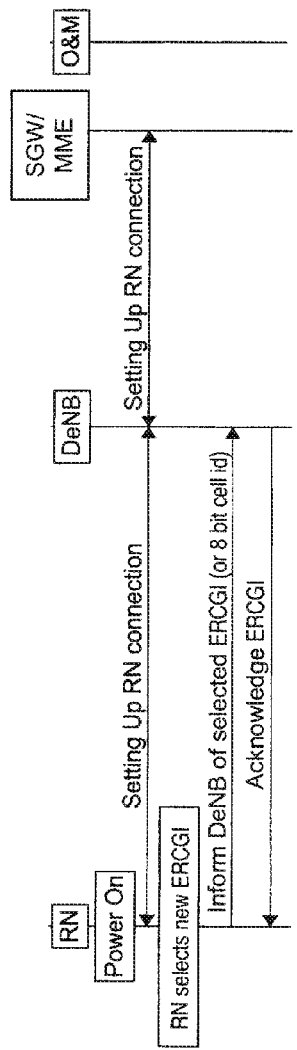
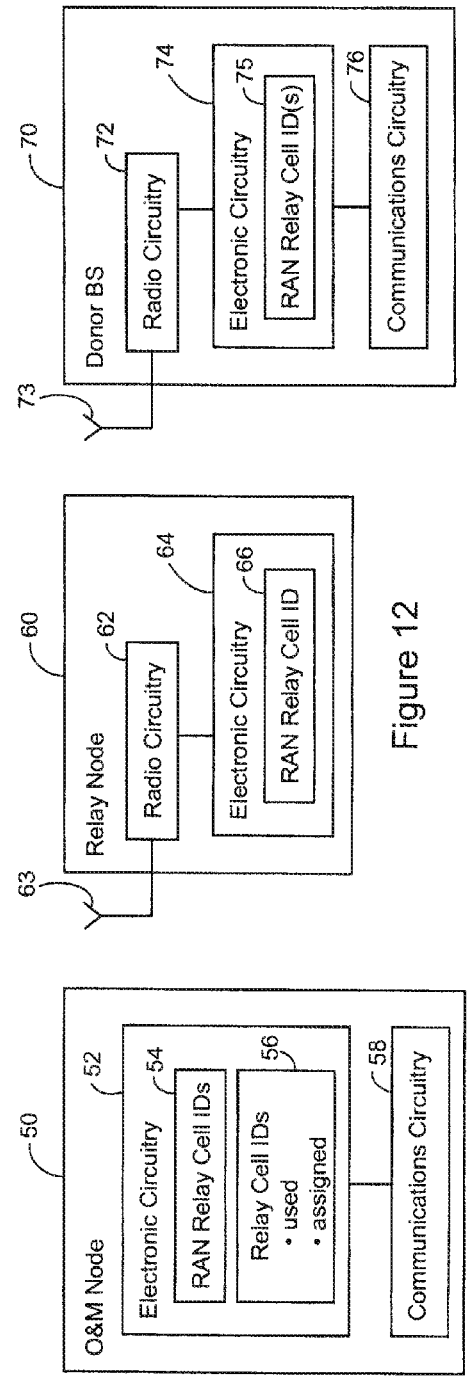
Figure 10
Figure 11
Figure 12
Figure 13

CONFIGURING RELAY CELL IDENTITIES IN CELLULAR NETWORKS

RELATED APPLICATION

This application is a continuation application of U.S. patent application Ser. No. 13/010,507, filed on Jan. 20, 2011, which claims priority to U.S. provisional patent application Ser. No. 61/320,416, filed on Apr. 2, 2010, the contents of which are incorporated herein by reference.

TECHNICAL FIELD

The technical field relates to communication networks including relay nodes for relaying communications between a donor radio base station and one or more user radio terminals, and more particularly, to methods and apparatus for identifying relay nodes.

BACKGROUND

LTE-Advanced (Long-Term Evolution) of cellular radio communications is standardized in 3GPP (3rd Generation Partnership Project). A general diagram of LTE as it may be interfaced with other networks is shown in FIG. 1.

The exponential growth in the demand for radio or "wireless" data communications has put tremendous pressure on cellular network operators to improve the capacity of their communication networks. Relay nodes can improve the coverage and capacity of radio communications networks. A relay node may be positioned between a radio base station and a mobile radio user terminal so that transmissions between that base station, referred to herein as the relay's "donor" base station, and the user terminal are relayed by the relay node.

LTE systems, e.g., 3GPP LTE Rel-10, may support Type 1 relay nodes, which appear to the user terminal (referred to in LTE as a user equipment (UE)) as a separate base station distinct from the donor base station. A base station is referred to as an enhanced NodeB (eNB) and a donor base station as a DeNB in LTE. The service areas covered by a Type 1 relay nodes, each serving one or several relay cells, referred to as relay cells, also appear to a user terminal as separate cells distinct from the cells of the donor base station. The relay cells controlled by the relay nodes include their own Physical Cell ID (as defined in LTE Rel-8), and the relay node transmits a synchronization channel, a reference symbol, etc. for each served relay cell. In the context of single-cell operation, the user terminal receives scheduling information and Hybrid Automatic Repeat-reQuest (HARQ) feedback directly from the relay node and sends control information, such as service requests (SRs), channel quality indications (CQIs), and acknowledgements (ACKs) to the relay node. A Type 1 relay node is backward compatible and appears as a base station to LTE Release 8 user terminals. Thus, from the perspective of a user terminal, there is no difference being served by a base station or a Type 1 relay node.

Transmissions between the relay node and the donor base station are over a radio interface called the Un interface in LTE. The Un interface, sometimes also referred to as the backhaul link, provides backhaul transport for data transferred between the relay node and user terminals connected to that relay node, and the core network. The LTE Rel-10 standard specifies radio protocols for the backhaul link. Transmissions between user terminal and relay node are over a radio interface called the Uu interface in LTE, which is also referred to as the access link. The radio protocols for the access link are the same in LTE as for direct radio communication between the user terminal and a base station (e.g., donor base station) without a relay node being located in between.

The relay node comprises two main parts: a user terminal part for communicating with the donor base station over the Un interface and a base station part for communicating with user terminals over the Uu interface. The user terminal part operates much like a normal user terminal. Thus, normal user terminal access procedures and methods are employed on the Un interface to establish connections between the relay node and the donor base station. These access procedures are described in 3GPP TR36.806, "Evolved Universal Terrestrial Radio Access (E-UTRA); Relay Architecture for E-UTRA (LTE-Advanced) (Release 9), incorporated herein by reference."

When a relay node attaches to the LTE network, it may optionally re-use the LTE user terminal (UE) "attach" procedure in order to establish Internet Protocol (IP) connectivity with the core network. Once the attach procedure is completed, the relay node contacts an Operations and Maintenance (O&M) system or other network node in the core network in order to become active as a base station.

The UE attach procedure in LTE is designed so that the eNB does not need to know unique UE identifiers, e.g., IMSI, IMEI, etc. Only the core network (the evolved packet core (EPC) including the mobility management entity (MME) in LTE) is typically aware of these globally unique UE identifiers. The eNB is aware of local identifiers of the UE-specific radio resource control (RRC) connection between the UE and eNB (identified by a cell radio network temporary identifier (CRNTI)) and the UE-specific S1 connection between the eNB and the MME (identified by MME UE S1AP ID and eNB UE S1AP ID). Furthermore, temporary identifiers are assigned (like the Globally Unique Temporary ID (GUTI) which identifies the MME and the temporary mobile subscriber identifier (TMSI) which identifies the UE within the MME) so as to avoid in many cases the need to transmit unique UE identifiers (e.g., IMSI, IMEI) over the radio interface and via the eNB.

In addition to the identities described above, each E-UTRAN cell broadcasts one public land mobile network (PLMN) identity, (or several in a PLMN-IdentityList), a unique 28-bit cell identity of the cell within the context of a PLMN, and a physical cell identity (PCI). The PCI is mapped to synchronization signals broadcast in the cell that the UE uses for cell search and cell identification. The number of available PCIs is limited per frequency layer, which means that the PCIs need to be reused. Ideally, however, the PCIs are perceived as locally unique per frequency layer so that a UE can identify handover candidate cells in measurement reports by their corresponding broadcasted PCIs. The combination of PLMN (the first PLMN in case of a list) and the 28-bit cell identity that uniquely identifies the cell within the scope of the PLMN is denoted the Evolved Cell Global Identifier (ECGI). This unique cell identifier ECGI can be used to look up the connectivity information of the candidate cell resulting in the functionality commonly referred to as Automatic Neighbor Relations (ANR).

One problem is how to determine and set the initial ECGIs of the relay node (RN) cells. A possible solution is to set the ECGIs of the relay node cells to a value that is independent of the donor base station's identifier, e.g., a DeNB ID, and instead use a dedicated eNB ID to the relay node. But a drawback with this solution is that the relationship that exists between the relay node and its DeNB cannot then be derived from the ECGIs of the relay node cells. For example, consider a situation where a first cell served by a first eNB is a neighbor cell to a second cell served by a second eNB, the second eNB is also a DeNB to a relay node, and there is no neighbor relation between the any of the relay node cells and the first cell. A UE served by the first cell detects one of the relay node cells and reports to the first cell the PCI and then the ECGI of that relay node cell. But the first eNB serving that first cell does not know and cannot readily determine that the RN is served by the second eNB (a neighbor of the first eNB) to which the first eNB already has established connectivity. In order to handle this situation, the MME needs to keep track of the relay node connectivity, which requires significant effort because the number of deployed relay nodes may outnumber the number of deployed eNBs by an order of magnitude. This results in inefficient relay node handling.

A similar problem exists when the core network (MME) wants to reach a specific relay node under a donor eNB. S1 messages are routed based on the eNB ID. So for dedicated relay node eNB IDs, the MME must keep track of all the relay node eNB IDs.

Another issue with using a fixed ECGI for each relay node cell is in dynamic situations where the radio conditions, mobility, etc. changes. In a changed situation, another eNB may be a more favorable eNB to serve the relay node than its current DeNB. As a result, the relay node may need to be relocated to a new DeNB that has a different eNB ID than the old DeNB. The MME routing information about the relocated RN thus needs to be updated at every RN relocation which requires extensive reconfiguration efforts.

What is needed is a better way to determine a relay cell identity that overcomes the problems and drawbacks identified above.

SUMMARY

The technology in this application identifies a relay cell serviced by a relay radio node in a radio access network (RAN) of a cellular communications system in which there is a radio connection between the relay radio node and a donor radio base station. The donor radio base station is identified by a RAN donor radio base station cell identifier. A RAN relay cell identifier is determined that uniquely identifies the relay cell within the RAN, the RAN relay cell identifier including a relay cell identifier and a donor base station identifier. The RAN relay cell identifier is then provided or used as needed so that the relay radio node can transmit the RAN relay cell identifier to uniquely identify the relay cell to one or more radio terminals in the RAN.

A first aspect includes a method for identifying a relay cell serviced by a relay radio node in a radio access network (RAN) of a cellular communications system in which there is a radio connection between the relay radio node and a donor radio base station. The RAN donor radio base station is identified by a donor radio base station cell identifier. A RAN relay cell identifier is determined that uniquely identifies the relay cell within the RAN, the RAN relay cell identifier including a relay cell identifier and the donor base station identifier. The RAN relay cell identifier is provided or used so that the relay radio node can transmit the RAN relay cell identifier to uniquely identify the relay cell to one or more radio terminals in the RAN.

A change in donor base station for the relay radio node to a different donor base station may be detected, and the RAN relay cell identifier changed to include a different donor base station identifier associated with the different donor base station.

Information intended for the relay node is routed in a core network of the cellular communications system using the donor base station identifier and the donor base station routes information to the relay node based on the relay cell identifier.

In one example implementation, the relay cell may be treated as a virtual cell of the donor base station.

In one example embodiment, the cellular communications system is LTE-based, the donor base station is a donor eNB, and the RAN relay cell identifier is an E-UTRAN relay cell global identifier including a PLMN identifier, a donor eNB E-UTRAN identifier, and a cell identifier. In this case, the radio connection between the relay radio node and an initial donor radio base station for the relay radio node may be established using an attach procedure.

In one example implementation, the method is implemented in an operations and maintenance (O&M) node. In one variation, the relay node may signal the donor base station identifier to an operations and maintenance (O&M) node. Moreover, the operations and maintenance (O&M) node may maintain a list of allocated relay cell identifiers for each donor base station.

In another example implementation, the method is implemented in the relay radio node and the relay node signals the RAN relay cell identifier to the donor base station.

A second aspect includes an operations and maintenance (O&M) node for use in configuring or reconfiguring an identity of a relay cell serviced by a relay radio node in a radio access network (RAN) of a cellular communications system in which there is a radio connection between the relay radio node and a donor radio base station, where the donor radio base station is identified by a RAN donor radio base station cell identifier. Electronic circuitry is configured to determine a RAN relay cell identifier that uniquely identifies the relay cell within the RAN, the RAN relay cell identifier including a relay cell identifier and the donor base station identifier. Communications circuitry is configured to provide the RAN relay cell identifier to the relay radio node so that the relay radio node can transmit the RAN relay cell identifier to uniquely identify the relay cell to one or more radio terminals in the RAN.

In an example embodiment, the cellular communications system is LTE-based, the donor base station is a donor eNB, and the RAN relay cell identifier is an E-UTRAN relay cell global identifier including a PLMN identifier, a donor eNB E-UTRAN identifier, and a cell identifier.

Other possible example implementation features include the communications circuitry receiving the donor base station identifier from the relay node and/or the electronic circuitry maintaining a list of allocated relay cell identifiers for each donor base station.

A third aspect includes a relay node apparatus for use in a radio access network (RAN) of a cellular communications system in which there is a radio connection between the relay radio node and a donor radio base station, where the donor radio base station is identified by a RAN donor radio base station cell identifier. Radio circuitry is configured to communicate over the air with the donor radio base station and with one or more user radio terminals. Electronic circuitry is configured to determine a RAN relay cell identifier that uniquely identifies a relay cell within the RAN serviced by the relay node, the RAN relay cell identifier including a relay cell identifier and the donor base station identifier. The radio circuitry is configured to transmit the RAN relay cell identifier to uniquely identify the relay cell to one or more user radio terminals in the RAN. Again, the cellular communications system may be LTE-based, the donor base station a donor eNB, and the RAN relay cell identifier an E-UTRAN relay cell global identifier including a PLMN identifier, a donor eNB E-UTRAN identifier, and a cell identifier. Alternatively, the relay node may transmit the RAN relay identifier to the donor base station.

In an example implementation, the relay node electronic circuitry is configured to determine the RAN relay cell identifier by receiving the RAN relay cell identifier from an operations and maintenance node. Alternatively, the relay node electronic circuitry is configured to determine the RAN relay cell identifier by receiving the RAN relay cell identifier from the donor base station. Another variation might be for the relay node electronic circuitry to calculate the RAN relay cell identifier.

A fourth aspect includes apparatus for a donor radio base station associated with a radio access network (RAN) donor base station identifier and configured for a radio connection with a relay radio node. The apparatus includes electronic circuitry configured to determine a RAN relay cell identifier that uniquely identifies the relay cell within the RAN, the RAN relay cell identifier including a relay cell identifier and a RAN donor base station identifier. Routing circuitry is configured to use the RAN relay cell identifier route data to the relay radio node. Again, an example implementation can be in an LTE-based cellular communications system where the donor base station is a donor eNB, and the RAN relay cell identifier is an E-UTRAN relay cell global identifier including a PLMN identifier, a donor eNB E-UTRAN identifier, and a cell identifier. In an example application, the donor base station is associated with multiple different relay cells, and the routing circuitry is configured to determine which relay cell to route information to based on the relay cell identifier associated with the information to be routed.

A fifth aspect also includes apparatus for a donor radio base station associated with a radio access network (RAN) donor base station identifier and configured for a radio connection with a relay radio node. In this case, electronic circuitry receives from the relay node a RAN relay cell identifier that uniquely identifies the relay cell within the RAN. The RAN relay cell identifier includes a relay cell identifier and a RAN donor base station identifier. Routing circuitry uses the RAN relay cell identifier route data to the relay radio node.

BRIEF DESCRIPTION OF THE DRAWINGS

FIG. 10 illustrates a non-limiting example signaling diagram relating to configuring a relay node in an LTE-based cellular radio communications system in accordance with a third non-limiting embodiment;

FIG. 11 is a simplified, non-limiting example function block diagram of an O&M node that may be used in configuring a relay node;

FIG. 12 is a simplified, non-limiting example function block diagram of a relay node; and FIG. 13 is a simplified, non-limiting example function block diagram of a donor base station node that may be used in configuring a relay node.

DETAILED DESCRIPTION

Figure 1:
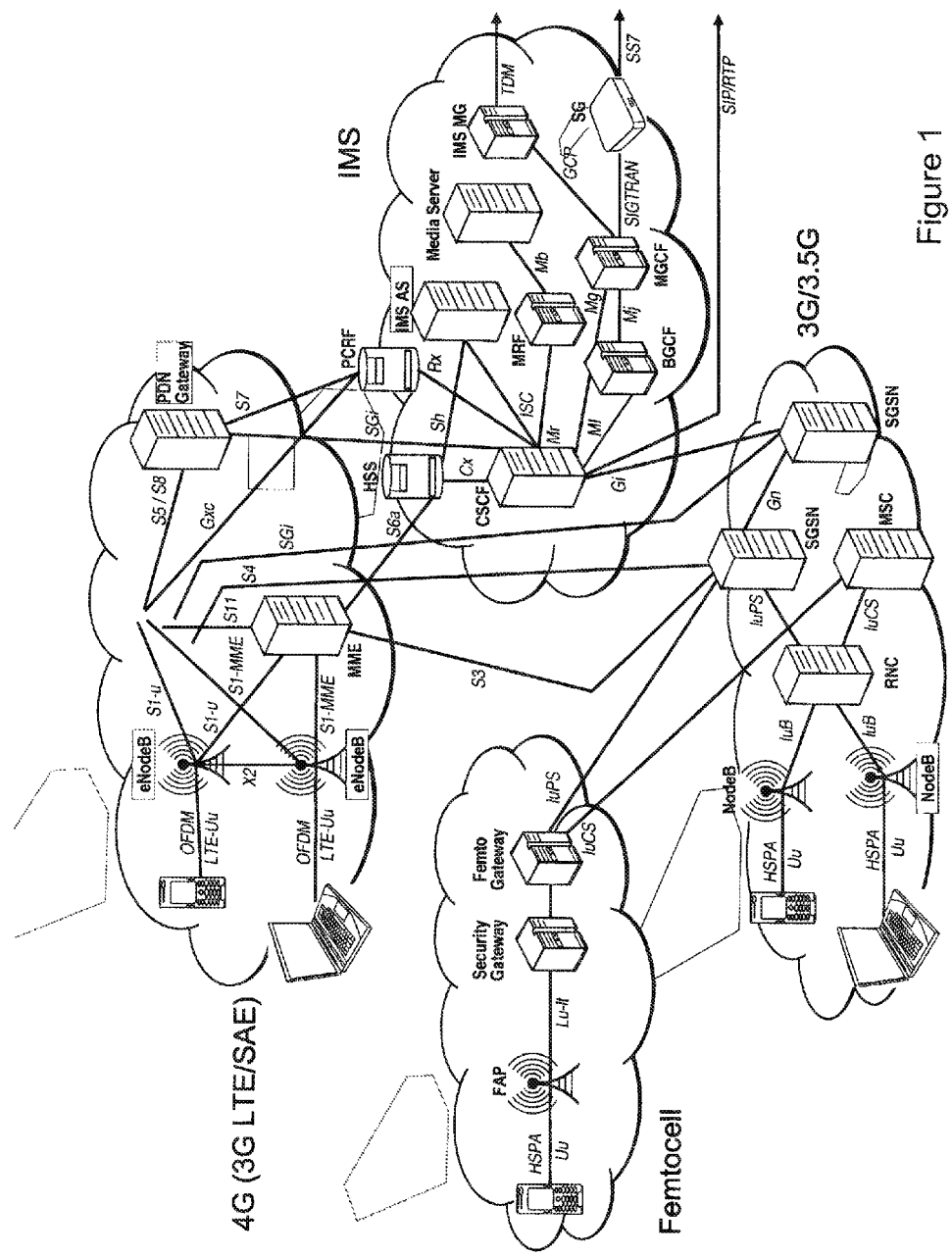
FIG. 1 illustrates a non-limiting example of a conventional LTE system as it may be interfaced with other networks.

In the following description, for purposes of explanation and not limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
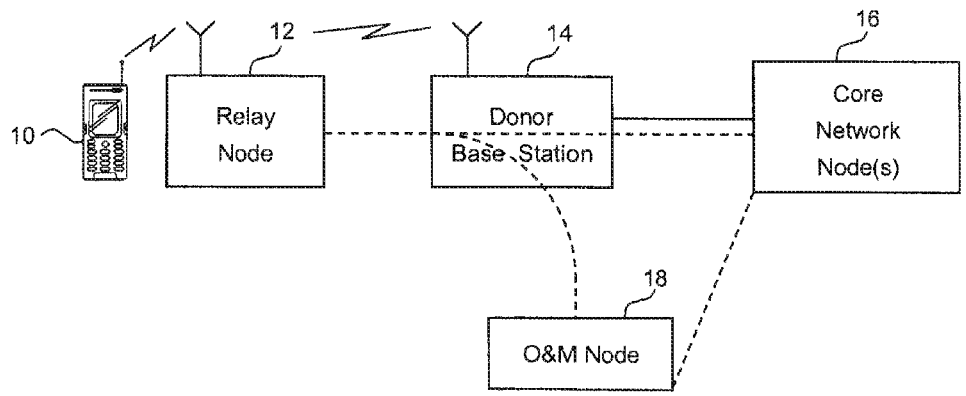
FIG. 2 is a non-limiting example function block diagram of cellular radio communications system including a relay node.

FIG. 2 is a non-limiting example function block diagram of cellular radio communications system including a relay node. A user terminal 10 located in or near a relay cell area serviced by a relay node 12 communicates over a radio interface with the relay node 12 which communicates with a donor base station 14 also over a radio interface. The donor base station 14 communicates with one or more network nodes 16 and an operation & maintenance (O&M) type node 18 either directly or through one or more other nodes as represented in the Figure by dotted lines. After the relay node 12 powers-on and attaches to the radio access network (RAN), of which the donor base station 14 is a part, the relay node 12 is configured for operation as a relay node. Part of the relay node configuration is the determination and setting of a RAN relay cell identifier that uniquely identifies the relay node's cell in the RAN based on the base station identifier of its donor base station 14 and a relay cell identifier that is not necessarily unique in the RAN. (The relay node may have more than one cell, but to simplify the description, only one cell is described in the example). As a result, the core network can easily send packets to the relay node 12 simply by routing those packets to the donor base station 14 using the donor base station's identifier. Once the donor base station receives that packet, it routes the packet to the relay node 12 using the relay node cell identifier or the entire RAN relay node cell identifier. The relay node cell identifier informs the donor base station that the packet is for a cell served by an associated relay node and, if the donor base station is associated with more than one relay node, which relay node should receive the packet.

Figure 3:
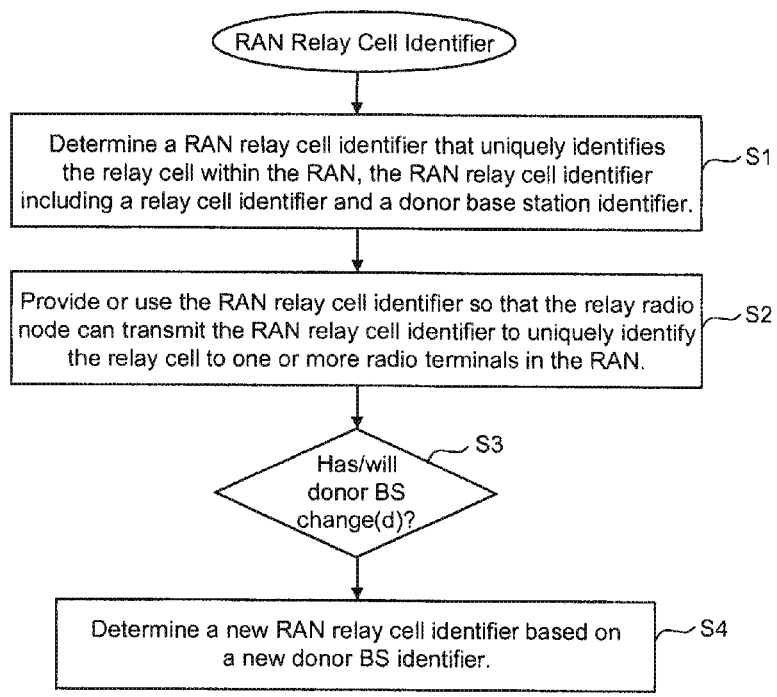
FIG. 3 is a flowchart diagram of non-limiting example procedures for determining, setting, and if necessary, changing a RAN relay cell identifier.

FIG. 3 is a flowchart diagram of non-limiting example procedures for determining, setting, and if necessary, changing a RAN relay cell identifier. First, basic radio connectivity is established with the relay node and the RAN, e.g., via its initial donor base station. After that connectivity is established, a RAN relay cell identifier is determined for each cell served by the relay node that uniquely identifies the relay cell within the RAN, the RAN relay cell identifier including a relay cell identifier and a donor base station identifier (step S1). Then, the RAN relay cell identifier is provided as needed so that the relay radio node can transmit the RAN relay cell identifier to uniquely identify the relay cell to one or more radio terminals in the RAN (step S2). Varying example embodiments describe below how such provision may be accomplished. A decision is made in step S3 whether the donor BS for the relay node has or will recently change. If so, a new RAN relay cell identifier is determined based on a new donor base station identifier (step S4). Steps S3 and S4 allow the RAN relay cell identifier to adapt to changes in the network, communication conditions, etc.

Figure 4:
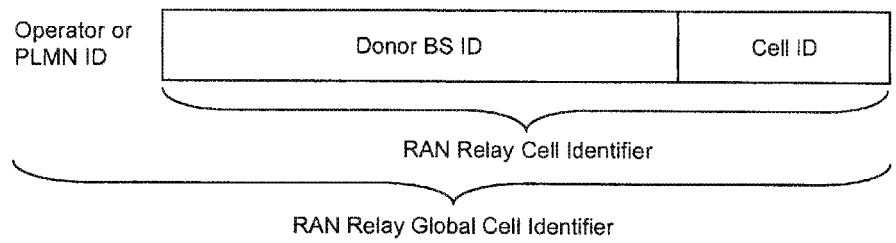
FIG. 4 illustrates a diagram of non-limiting example RAN relay cell identifiers.

FIG. 4 illustrates a diagram of non-limiting example RAN relay cell identifiers. A first is a RAN relay cell identifier that includes a cell identifier of the relay cell (this cell identifier may or may not be unique within the RAN) and a current donor base station identifier that is unique within the RAN. As a result, the RAN relay cell identifier is also unique within the RAN. A RAN relay global cell identifier may be formed by appending a network operator or public land mobile network (PLMN) identifier to the RAN relay cell identifier.

Figure 5:
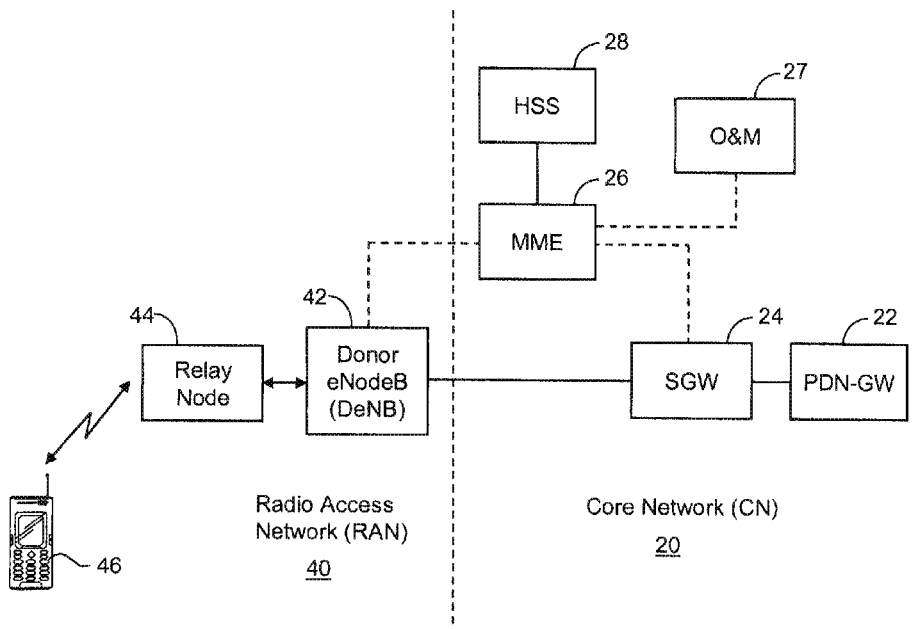
FIG. 5 is a non-limiting example function block diagram of an LTE-based cellular radio communications system including a relay node.

FIG. 5 is a non-limiting example function block diagram of an LTE-based cellular radio communications system including a relay node. Of course, the principles described with respect to such an LTE-based implementation may also be applied to networks based on other communication standards now known or later developed.

The core network 20 and the radio access network (RAN) 40 are shown divided by a dashed line. The core network 20 is responsible for the overall control of the user terminal or UE 46 and for establishing bearers between the UE 46 and one or more external networks, such as the Internet or other packet data networks (PDNs). The main logical components of the LTE core network 20 comprise the Packet Data Network Gateway (PDN-GW) 22, the Serving Gateway (SGW) 24, the Mobility Management Entity (MME) 26, and the Home Subscriber Server (HSS) 28. In addition to these nodes, the core network 20 may include other logical nodes, such as an operations and management (O&M) system node 27. Alternatively, an O&M node may be separate from the core network 20, which is the case for example in LTE. The PDN-GW 22 provides connection to one or more external packet data networks and is responsible for assigning IP addresses to the user terminals. The SGW 24 serves as a mobility anchor point for the user terminal so that all packets transferred between the user terminal 46 and a packet data network pass through the SGW 24. The MME 26 control node is responsible for mobility management, connection management, and bearer management. The HSS 28 stores subscriber information as well as the current locations of the user terminals 46. The MME 26 communicates with the HSS 28 when the user terminals 46 attach to the network to authenticate and authorize the user terminals 46.

The radio access network (RAN) 40 comprises a network of base stations 42 called Evolved Node Bs (eNBs) that communicate over the radio interface with the user terminals. Sometimes the RAN is referred to as an evolved UMTS Terrestrial RAN (E-UTRAN). The base stations 42 provide radio coverage in respective cells 12 of the communication network 10. Although only one base station 42 is shown, a typical RAN 40 comprises many base stations 42.

The eNB 42 may communicate with user terminals 46 via relay nodes 44. In this case, the eNB 42 is referred to as a donor eNB (DeNB). The relay node 44 relays signals between the DeNB 42 and one or more user terminals 46 in or near one or several relay cell(s) associated with the relay node 44. For downlink communications, the relay node 44 receives signals from the DeNB 42 over the Un interface and transmits signals to the user terminals 46 over the Uu interface. For uplink communications, the relay node 44 receives signals from the user terminals 46 over the Uu interface and transmits signals to the DeNB 42 over the Un interface. The relay node 44 may use the same or different frequencies on the Un and Uu interface.

When a relay node 44 is deployed, the relay node 44 attaches to the core network 20 and downloads configuration information from a network node in the O&M system. As mentioned in the background, the attach procedure is designed so that the base station 42 does not need to know unique identifiers, such as the International Mobile Subscriber Identity (IMSI) and International Mobile Equipment Identification (IMEI), of the relay node 44.

Figure 6:
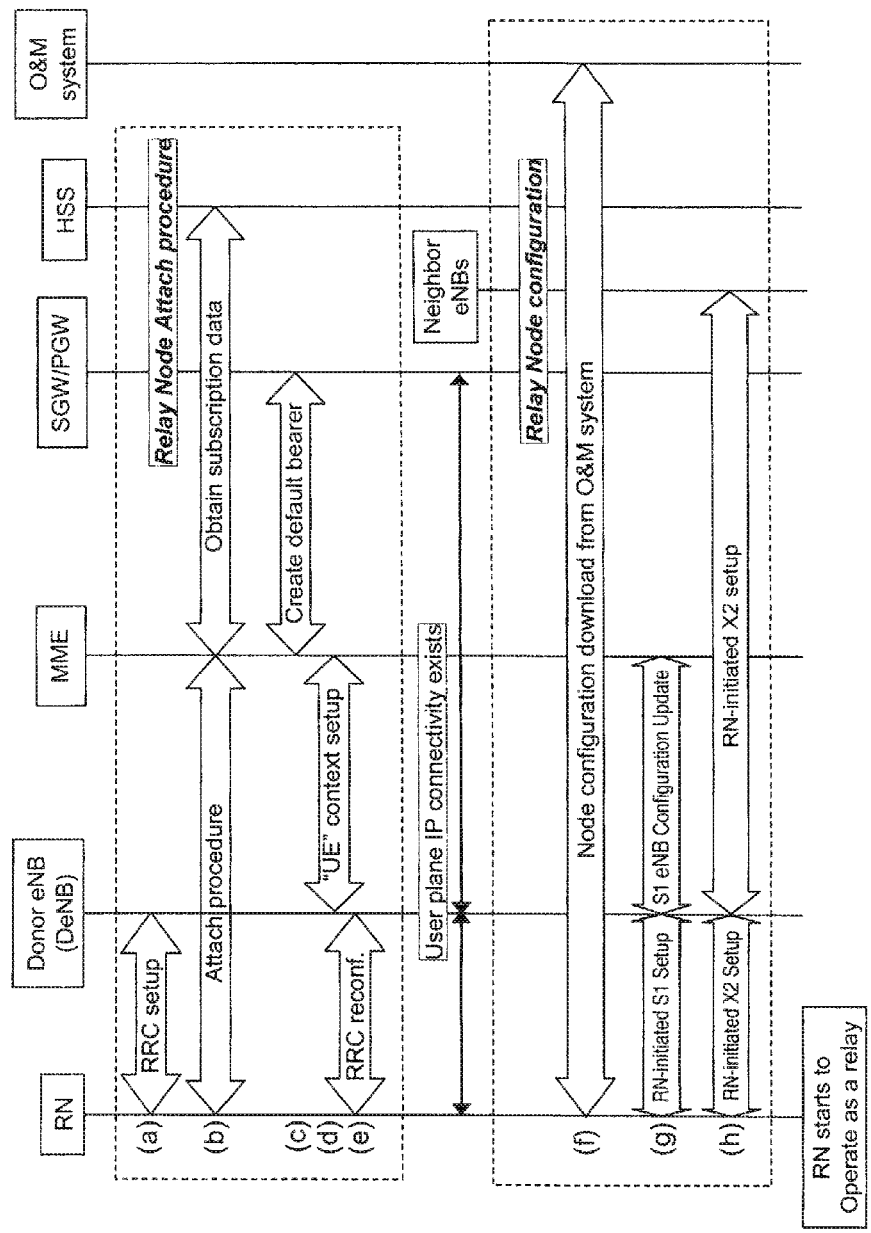
FIG. 6 illustrates a non-limiting example signaling diagram relating to attaching and configuring a relay node in an LTE-based cellular radio communications system.

FIG. 6 illustrates a non-limiting example signaling diagram relating to attaching and configuring a relay node in an LTE-based cellular radio communications system. The relay node 44 initially establishes a radio resource control (RRC) connection with a DeNB 42 (step a). In this step, the relay node may or may not identify itself as a relay node to the DeNB 42. Once the RRC connection is established, the relay node 44 executes an attach procedure with the MME 26 in the core network 20 (step b). During the attach procedure, the MME 26 obtains subscription data from the HSS 28, sets up default bearers with the SGW 24 and PDN-GW 22 to carry user traffic (step c), and performs a context set-up procedure to establish a session for the mobile terminal (step d). After the context set-up procedure, the DeNB 42 reconfigures the Radio Resource Control (RRC) connection (step e). When the RRC connection is reconfigured, user plane IP connectivity exits, and the relay node 44 may send data to the DeNB 42, which is forwarded by the DeNB 42 to the SGW 24/PDN-GW 22.

Following the relay node attach procedure, the relay node 44 may download configuration information from the O&M system (or other network node) (step f). The relay node 44 may upload information about the base station identifier of the DeNB 42. If the relay node has identified itself as a relay in step a, then a RAN relay cell identifier is determined and provided or used for each relay cell so that the relay node may broadcast it to UEs in or near its relay cell. Moreover, the RAN relay cell identifier will be used by the core network and the DeNB to route data packets and signaling messages to the relay node 44. The relay node 44 may use the configuration information to set up the S1 and X2 interfaces (steps g, h) with the DeNB 42. In step h, the DeNB preferably performs an RN-initiated X2 setup with one or more neighbor eNBs. Thereafter, relay node 44 starts to operate as a relay. Additionally, the DeNB 42 may use the relay node configuration information for fault and performance management and other management functions.

If the relay node does not identify itself as a relay in step a, then it still may download configuration information from the O&M system. This information may comprise for each relay cell a list of assigned RAN relay cell identifiers, one for each possible DeNB. Furthermore, in this case, the relay node does not perform steps g and h. Instead, the relay node will detach as a UE, and possibly re-attach, this time identifying itself as a relay node in step a.

Figure 7:
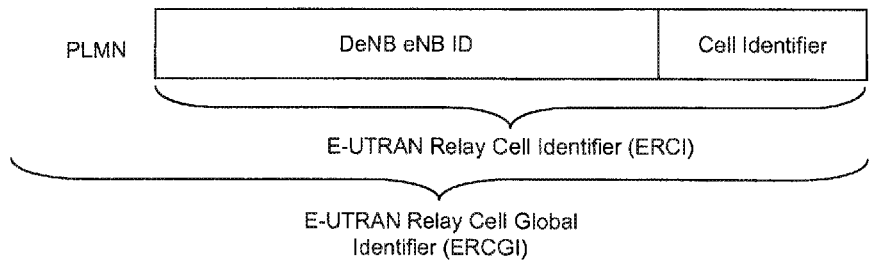
FIG. 7 illustrates a diagram of non-limiting example RAN relay cell identifiers for use in an LTE-based cellular radio communications system.

FIG. 7 illustrates a diagram of non-limiting example RAN relay cell identifiers for use in an LTE-based system like that described in FIGS. 5 and 6. A first is an E-UTRAN relay cell identifier that includes a cell identifier of the relay cell (this cell identifier may or may not be unique within the RAN) and a current DeNB identifier that is unique within the E-UTRAN. As a result, the E-UTRAN relay cell identifier is also unique within the E-UTRAN. An E-UTRAN relay global cell identifier may be formed by appending a network operator or public land mobile network (PLMN) identifier to the RAN relay cell identifier. The relay node's broadcasting of its E-UTRAN relay cell identifier to nearby UEs permits other eNBs to derive the DeNB's ID from the information reported by a UE.

The cell identifier part may be derived from the C-RNTI of the relay node or some other parameter assigned to the relay node (e.g., GUTI, security key, etc). Alternatively, the cell identifier part may be taken from a dedicated subrange of an entire range of cell identifiers, for example by reserving a dedicated subrange per relay node vendor. It also may be retrieved from memory as the cell identifier that the relay node cell had at a previous time when the relay node was served by the same DeNB. Another option is to select the cell identifier part based on DeNB neighbor information to derive a list of occupied ECGIs, i.e., ECGI used by other served RN cells, in order to select a vacant cell identifier.

Similar to the procedures outlined for FIG. 3, a relay node RN is associated to a donor eNB (DeNB) either at its first power-on and attach procedure or as a result of handover from a different DeNB. If the DeNB ID part of the E-UTRAN relay cell identifier does not match the eNB ID of the current DeNB for the relay node, then the E-UTRAN relay cell identifier is changed to include the DeNB ID of the current DeNB while the relay cell identifier remains the same. Alternatively, the entire E-UTRAN relay cell identifier is changed, where the DeNB ID part is changed to the current DeNB ID.

In one non-limiting embodiment, the RAN relay cell identifier is determined and stored in the relay node 44 and conveyed to the DeNB 42, O&M node, and/or MME 26 during the relay node attach procedure. The RAN relay cell identifier may be conveyed directly to the donor base station 42 via RRC signaling or as part of as part of the S1-Application Part (S1-AP) or X2 Application Part (X2-AP) signaling. Alternatively, the RAN relay cell identifier may be initially conveyed to the MME 26 as network access stratum (NAS) signaling. The MME 26 may then convey the RAN relay cell identifier to the DeNB 42 during S1-AP context set-up. The RAN relay cell identifier may also be sent to and stored by the HSS 28. In all scenarios, the RAN relay cell identifier may be conveyed securely using ciphering and/or integrity protection.

Figure 8:
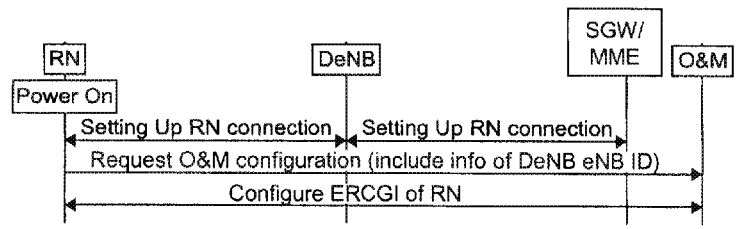
FIG. 8 illustrates a non-limiting example signaling diagram relating to configuring a relay node in an LTE-based cellular radio communications system in accordance with a first non-limiting embodiment.

FIG. 8 illustrates a non-limiting example signaling diagram relating to configuring a relay node (RN) in an LTE-based cellular radio communications system in accordance with a first non-limiting embodiment. After the relay node powers-on and a connection is established with the DeNB and core network (e.g. SGW/MME), the relay node sends a Request O&M Configuration message to the O&M node via the DeNB directly or further via the SGN/MME. The Request O&M Configuration message includes information regarding theof the base station identifier of the DeNB, e.g., the eNB ID of the DeNB. The O&M determines and signals an E-UTRAN relay cell global identifier (ERCGI) to the relay node based on knowledge in the O&M system on which DeNB the relay node is currently connected to (this can be provided by the relay node or by the DeNB). The O&M system may also inform the DeNB of the ERCGIs assigned to the relay node cells. An alternative is that the relay node informs the DeNB about ERCGIs of served cells. Once the relay node is configured, it broadcasts the ERCGI in its relay cell for detection by UEs that are near or in the cell.

Figure 9:
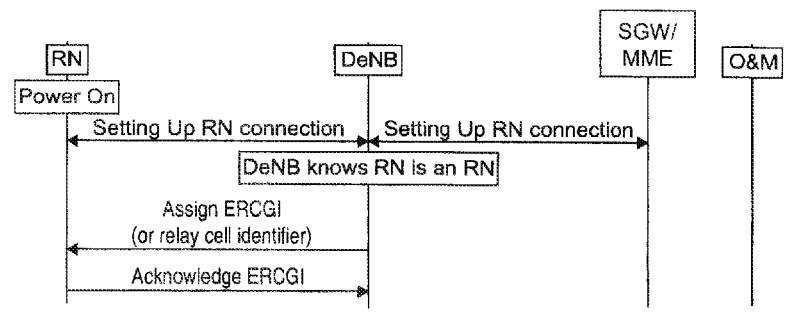
FIG. 9 illustrates a non-limiting example signaling diagram relating to configuring a relay node in an LTE-based cellular radio communications system in accordance with a second non-limiting embodiment.

FIG. 9 illustrates a non-limiting example signaling diagram relating to configuring a relay node in an LTE-based cellular radio communications system in accordance with a second non-limiting embodiment. After the relay node powers on and a connection is established with the DeNB and core network (e.g. SGW/MME), the DeNB knows that the relay node is a relay node, and thus, the relay node also knows the base station identifier of the DeNB. The DeNB of the relay node selects and signals to the relay node a new E-UTRAN relay cell global identifier (ERCGI), for example using RRC, X2, S1, O&M, or some other signaling. Alternatively, because the relay node also knows the base station identifier of the DeNB, the DeNB selects and signals to the relay node only a relay cell identifier, and the relay node combines the selected relay cell identifier with the base station identifier of the DeNB to compile a new E-UTRAN relay cell identifier. The relay node signals the assigned ERCGIs or relay cell identifiers to the O&M system. Once the relay node is configured, it broadcasts the ERCGI in its relay cell for detection by UEs that are near or in the cell.

FIG. 10 illustrates a non-limiting example signaling diagram relating to configuring a relay node in an LTE-based cellular radio communications system in accordance with a third non-limiting embodiment. After the relay node powers on and a connection is established with the DeNB and core network (e.g. SGW/MME), the relay node sets and/or changes its E-UTRAN relay cell global identifier (ERCGI) of each served relay cell based on information about the eNB ID of the DeNB. The relay node signals the new ERCGI to its DeNB and to the neighbor cells of the relay node cell (not shown). The DeNB acknowledges the received ERCGI.

In another example embodiment, the relay node can change its ERCGI based on information about the DeNB identifier and/or some other signaling parameter which is configured by the DeNB (e.g., the CRNTI). Moreover, the DeNB can advantageously derive the ERCGI of the relay node by combining the DeNB base station identifier and a derived relay cell identifier from the assigned parameter (e.g., CRNTI). A benefit with this embodiment is that the relay node does not need to inform the DeNB of its ERCGI thereby conserving radio and other resources.

FIG. 11 is a simplified, non-limiting example function block diagram of an O&M node 50 that may be used in configuring and/or communicating with a relay node. The O&M node 50 includes electronic circuitry 52 that is configured to determine and store RAN relay cell identifiers as described above. The RAN relay cell identifiers 54 may be stored in memory. The O&M node 50 may also store a configured range of relay cell identifiers 56, from which relay node cells are assigned relay cell identifiers. Furthermore, the O&M node 50 may also store information about assigned relay cell identifiers and used cell identifiers fro each DeNB in order to allow derivation of vacant relay cell identifiers given a DeNB eNB ID, The electronic circuitry 52 is connected to communications circuitry 58 that permits the electronic circuitry 52 to communicate with other network nodes. The O&M node electronic circuitry may also be configured to perform other O&M system functions, or those other functions may be performed by other circuitry.

FIG. 12 is a simplified, non-limiting example function block diagram of a relay node 60. The relay node 60 comprises radio circuitry 62 coupled to one or more antennas 63 which may include a first transceiver for communicating with the donor base station and other network nodes (e.g., an O&M node) over the Un interface and a second transceiver for communicating with the user terminals over the Uu interface. Alternatively, the same transceiver may be used for communications on both the Uu and Un interfaces. The radio circuitry 62 is connected to electronic circuitry 64 configured to perform operations relating to determining by itself or by receiving from another node its RAN relay cell identifier and to broadcast that RAN relay cell identifier using the radio circuitry 62 and antenna(s) 63.

FIG. 13 is a simplified, non-limiting example function block diagram of a donor base station node 70 that may be used in configuring and/or communicating with a relay node. The donor base station node 70 comprises radio circuitry 72 coupled to one or more antennas 73 which may include a first transceiver for communicating with one or more relay node over the Un interface and a second transceiver for communicating with the user terminals over the Uu interface. Alternatively, the same transceiver may be used for communications on both the Uu and Un interfaces. The radio circuitry 72 is connected to electronic circuitry 74 configured to perform operations relating to determining by itself or by receiving from another node one or more RAN relay cell identifiers of relay nodes being serviced by the base station. The electronic circuitry 74 is connected to communications circuitry 76 that permits the electronic circuitry 74 to communicate with other network nodes like one or more other base stations, core network nodes, and an O&M node.

The technology described in this application offers several advantages. It allows for efficient and flexible determination and setting of the initial RAN relay cell identifier. The core network can easily route data packets and messages to a relay node simply by sending those packets to the relay's donor base station identifier. As a result, the core network does not need to generate and keep track of base station identifiers for relay nodes which is much more efficient. Moreover, the technology adapts to changes in the donor base station for a relay node so that the RAN relay cell identifier can be easily updated to reflect the new donor base station identifier. The relationship that exists between the relay node and its donor base station can be readily derived from the relay node cell's RAN relay cell identifier. In addition, the lookup of new neighbor cells is efficient because connectivity can be associated to the donor base station identifier part of the RAN relay cell identifier, and connectivity to donor base station identifier associations are much fewer than connectivity to RAN relay cell identifier associations. In other words, there will likely be fewer donor base stations to keep track of than relay nodes. In the example problem scenario given in the background section, the first eNB can determine that the relay node is served by the second eNB that the first eNB already has established connectivity to the second eNB. As a result, no additional connectivity lookup needs to be performed due to the discovery of the relay node cell. Furthermore, the RAN relay cell identifiers for relay nodes fit well with the concept that relay node cells operate as virtual cells to a donor base station. By "reusing" the donor base station's identifier to form part of the RAN relay cell identifier, the relay cell is established as a "virtual" cell to the donor base station making it easier to address the relay cell as well as to configure the relay cell and register it with the core network.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method in an operations and maintenance (O&M) node for identifying a relay cell serviced by a relay radio node in a radio access network (RAN) of a cellular communications system in which there is a radio connection between the relay radio node and a donor radio base station, where the RAN donor radio base station is identified by a donor radio base station cell identifier, comprising the steps of:
receiving the donor base station cell identifier from the relay radio node,
determining a RAN relay cell identifier that uniquely identifies the relay cell within the RAN, the RAN relay cell identifier including a relay cell identifier and the donor base station cell identifier; and providing the RAN relay cell identifier to the relay radio node so that the relay radio node can transmit the RAN relay cell identifier to uniquely identify the relay cell to one or more radio terminals in the RAN.

2. The method of claim 1, wherein the operations and maintenance (O&M) node maintains a list of allocated relay cell identifiers for each donor base station.

3. The method of claim 1, further comprising:
determining a change in donor base station for the relay radio node to a different donor base station, and
changing the RAN relay cell identifier to include a different donor base station identifier associated with the different donor base station.

4. The method of claim 1, wherein information intended for the relay node is routed in a core network of the cellular communications system using the donor base station identifier and the donor base station routes information to the relay node based on the relay cell identifier.

5. The method of claim 1, wherein the relay cell is treated as a virtual cell of the donor base station.

6. The method of claim 1, wherein the cellular communications system is LTE-based, the donor base station is a donor eNB, and the RAN relay cell identifier is an E-UTRAN relay cell global identifier including a PLMN identifier, a donor eNB E-UTRAN identifier, and a cell identifier.

7. The method of claim 1, wherein the radio connection between the relay radio node and an initial donor radio base station for the relay radio node is established using an attach procedure.

8. The method of claim 1, wherein relay cell identifier is taken from a dedicated sub-range of an entire range of cell identifiers.

9. An operations and maintenance (O&M) node for use in configuring or reconfiguring an identity of a relay cell serviced by a relay radio node in a radio access network (RAN) of a cellular communications system in which there is a radio connection between the relay radio node and a donor radio base station, where the donor radio base station is identified by a RAN donor radio base station cell identifier, the operation and maintenance (O&M) node comprising:

electronic circuitry configured to determine a RAN relay cell identifier that uniquely identifies the relay cell within the RAN, the RAN relay cell identifier including a relay cell identifier and the donor base station cell identifier, where the donor base station cell identifier is received in the maintenance (O&M) node from the relay radio node; and communications circuitry configured to provide the RAN relay cell identifier to the relay radio node so that the relay radio node can transmit the RAN relay cell identifier to uniquely identify the relay cell to one or more radio terminals in the RAN.

10. The node of claim 9, wherein the operations and maintenance (O&M) node is configured to maintain a list of allocated relay cell identifiers for each donor base station.

11. The node of claim 9, further being configured to:
determine a change in donor base station for the relay radio node to a different donor base station, and
change the RAN relay cell identifier to include a different donor base station identifier associated with the different donor base station.

12. The node of claim 9, wherein relay cell identifier is taken from a dedicated sub-range of an entire range of cell identifiers.

* * * * *

UNITED STATES PATENT AND TRADEMARK OFFICE
CERTIFICATE OF CORRECTION

| | | |
|---|---|---|
| PATENT NO. | : 9,124,510 B2 | Page 1 of 1 |
| APPLICATION NO. | : 14/095105 | |
| DATED | : September 1, 2015 | |
| INVENTOR(S) | : Gunnarsson et al. | |

It is certified that error appears in the above-identified patent and that said Letters Patent is hereby corrected as shown below:

On the title page item (72), delete "Sundyberg" and insert -- Sundbyberg --, therefor.

In the specification

Column 1, Line 7, delete "2011," and insert -- 2011, now Pat. no. 8,620,302, --, therefor.

Column 10, Line 30, delete "SGN/MME." and insert -- SGW/MME. --, therefor.

Column 10, Line 32, delete "theof the" and insert -- the --, therefor.

Column 11, Line 28, delete "fro" and insert -- from --, therefor.

Column 11, Line 30, delete "ID," and insert -- ID. --, therefor.

In the claims

Column 14, Line 14, Claim 9, delete "maintenance" and insert -- operations and maintenance --, therefor.

Signed and Sealed this
Fifteenth Day of March, 2016

Michelle K. Lee
*Director of the United States Patent and Trademark Office*